(12) United States Patent
Lesîkar et al.

(10) Patent No.: US 9,618,528 B2
(45) Date of Patent: Apr. 11, 2017

(54) SPEED SENSOR

(71) Applicant: LESIKAR, A.S., Tábor (CZ)

(72) Inventors: Vladimir Lesîkar, Tabor (CZ);
Ladislav PŮ r, Prague (CZ)

(73) Assignee: LESIKAR, A.S., Tábor (CZ)

( * ) Notice: Subject to any disclaimer, the term of this patent is extended or adjusted under 35 U.S.C. 154(b) by 16 days.

(21) Appl. No.: 14/772,199

(22) PCT Filed: Feb. 26, 2014

(86) PCT No.: PCT/CZ2014/000021
§ 371 (c)(1),
(2) Date: Sep. 2, 2015

(87) PCT Pub. No.: WO2014/135132
PCT Pub. Date: Sep. 12, 2014

(65) Prior Publication Data
US 2016/0018433 A1    Jan. 21, 2016

(30) Foreign Application Priority Data

Mar. 5, 2013    (CZ) .................................... 2013-163

(51) Int. Cl.
*G01P 3/488*    (2006.01)
*G01P 3/489*    (2006.01)

(52) U.S. Cl.
CPC .............. *G01P 3/488* (2013.01); *G01P 3/489* (2013.01)

(58) Field of Classification Search
CPC ................................ G01P 3/489; G01P 3/488
See application file for complete search history.

(56) References Cited

U.S. PATENT DOCUMENTS

| | | | |
|---|---|---|---|
| 6,271,663 B1 | 8/2001 | Kanbe et al. | |
| 2003/0141864 A1* | 7/2003 | Babin | G01D 3/022 324/207.12 |
| 2008/0083168 A1* | 4/2008 | Booth | E05F 15/646 49/360 |
| 2011/0251805 A1* | 10/2011 | Plankenhorn | G01D 5/145 702/57 |
| 2011/0270553 A1 | 11/2011 | Ausserlechner et al. | |
| 2011/0298450 A1 | 12/2011 | Foletto et al. | |
| 2012/0092000 A1 | 4/2012 | Lohberg et al. | |

OTHER PUBLICATIONS

International Search Report and Written Opinion for PCT/CZ2014/000021 Filed on Feb. 26, 2014.
International Preliminary Report on Patentability for PCT/CZ2014/000021 Filed on Feb. 26, 2014.

* cited by examiner

*Primary Examiner* — Patrick Assouad
*Assistant Examiner* — Haidong Zhang
(74) *Attorney, Agent, or Firm* — Notaro, Michalos & Zaccaria P.C.

(57) ABSTRACT

A speed sensor (1) including a first magnetic sensor (3) with a first magnetic detector (30), which is connected to an electronic circuit for conversion of its output analog signal to a first digital signal and a second magnetic sensor (4) with a second magnetic detector (40), which is also connected to an electronic circuit for conversion of its output analog signal to a second digital signal.

2 Claims, 3 Drawing Sheets

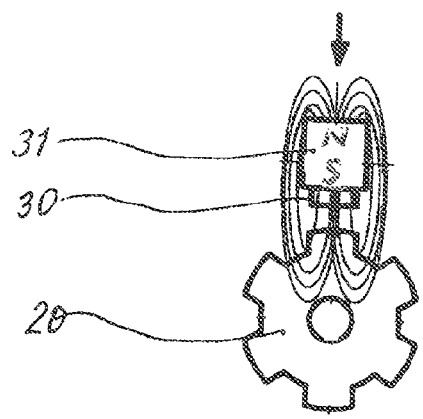
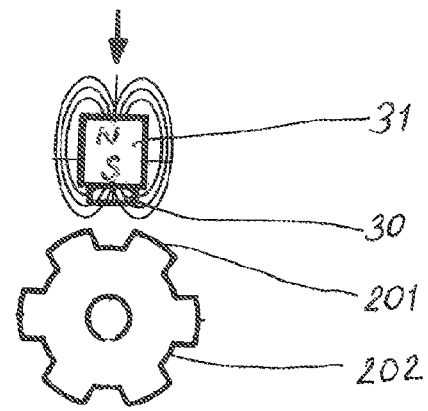
FIG. 1a  FIG. 1b
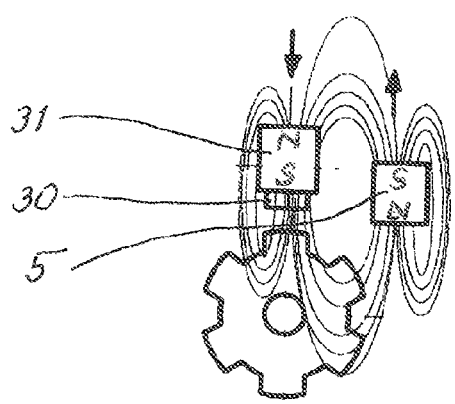
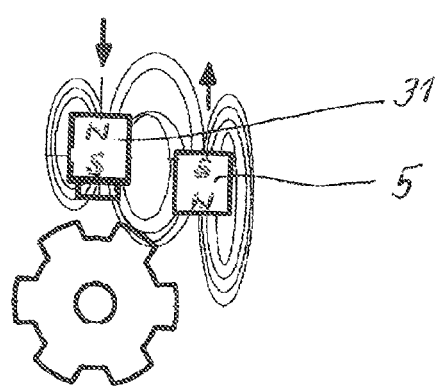
FIG. 2a  FIG. 2b
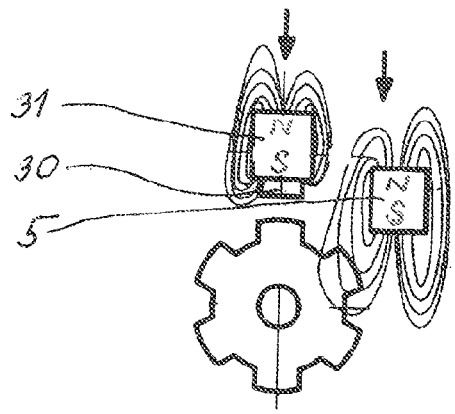
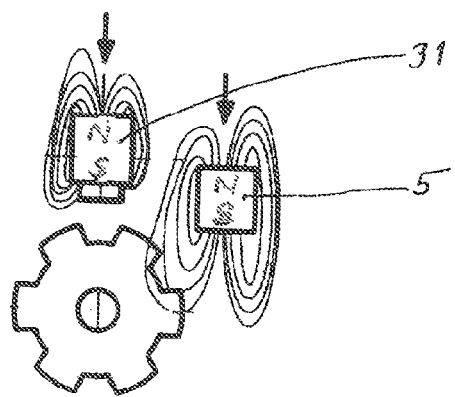
FIG. 3a  FIG. 3b

SPEED SENSOR

FIELD OF THE INVENTION

The invention relates to a speed sensor, in particular for tachographs, which is immune to the impact of a disturbing external magnetic field. Such a speed sensor may for instance prevent tampering with tachograph records.

BACKGROUND OF THE INVENTION

A tachograph, which for example, dependent on time, graphically records the history of the vehicle driving, such as the vehicle speed, driving time and stopovers, receives a digital signal from a speed sensor. The speed sensor is mostly located in the vehicle gearbox and scans the speed of the gearwheel on the output shaft of the gearbox. Typically, speed sensors with Hall detectors are used. The Hall detector is placed in close proximity of the gearwheel periphery at a distance from about 0.5 to 2 mm. During driving, the said gearwheel rotates in direct proportion to the vehicle velocity and always when the gearwheel tooth passes in front of the Hall sensor, the magnetic lines of force of the basic magnet of the Hall sensor are concentrated in the Hall detector center causing thus the increase in the Hall detector output voltage. On the contrary, when a gap between the gearwheel teeth passes in front of the Hall sensor, the magnetic lines of force are diluted and the intensity of the magnetic field decreases what results in the decline of the Hall detector output voltage. The output voltage signal from the Hall detector is analog and in the electronic circuit of the Hall sensor the analog signal is converted to a digital signal, which proceeds to tachograph, where the signal is processed to show a graphical or another record of the vehicle driving history. The conversion of the analog signal, which when scanning the rotating gearwheel, is substantially of sinusoidal character, to a digital signal, occurs only when the predetermined upper and lower threshold value of the output voltage from the Hall sensor is exceeded, which output signal is a function of intensity of the magnetic field in the center of the Hall sensor. When the basic magnetic field of the Hall sensor is affected by a disturbing magnetic field generated for example by attaching a magnet with a strong disturbing magnetic field to the gearbox case near the speed sensor, both the magnetic fields interfere with each other so that the intensity of the resulting magnetic field in the center of the Hall detector either increases or drops dependent on the mutual polarity of both magnets, i.e. that of the disturbing magnet and the magnet of the Hall sensor. The result is that the output voltage in the form of the analog signal from the Hall detector increases or drops so that the predetermined threshold values of the output voltage at which the analog signal is converted to a digital signal are no more exceeded and the output digital signal of the speed sensor has a constant value. Due to the absence of any change or frequency of the digital signal respectively, the tachograph records the stationery mode of the vehicle even when the vehicle is moving.

Known are also speed sensors with the Hall sensor and electronic processing of the analog signal to the digital signal, where the upper and the lower threshold values the excess of which causes the conversion of the analog signal to the digital signal, are self-adjusting with respect to the upper and lower peeks of the analog signal so that the conversion of the analog signal to the digital signal is missing only in the event when the intensity of the magnetic field in the center of the Hall detector is out of the sensitivity of the Hall sensor i.e. under ca 10 mT or above ca 500 mT in absolute values. On the contrary, when the intensity of the magnetic field in the center of the Hall detector is in its range of sensitivity, i.e. between ca 10 mT and ca 500 mT, the analog signal is always converted to the digital signal. In this situation, the strength or intensity, respectively, of the magnetic field in the center of the Hall detector is determined by the interference between the magnetic field of the magnet of the Hall sensor and the magnetic field of the disturbing magnet located in close proximity to the magnetic speed sensor using the Hall sensor—see for instance US 2011/0251805 A1.

US 2012/009000 A1 discloses a speed sensor with two detecting elements of different sensitivity producing two output signals, which, when the detecting elements are exposed to disturbing magnetic fields differ from each other so that the detecting element with a lower sensitivity issues undistorted signal corresponding to the actual speed and the detecting element with a high sensitivity gives a distorted signal, inadequate to the actual speed.

U.S. Pat. No. 6,271,663 B1 describes a rotational detector for detecting a rotational position comprising several magneto-resistive detectors arranged at angular intervals on a circle circumscribing the rotational axis of a rotor. The magnets of detectors are arranged so that their axes are disposed radially and not aligned with the sensitive axis of the magneto-resistive detectors whereby the polarities of adjacent magnets are opposite.

The common disadvantage of the above described speed sensors is that when they are exposed to an external disturbing magnetic field, the magnetic field in the center of the detector may be diminished or amplified to the extent that it comes outside the sensitivity range of the Hall detector and the output analog signal is missing. At the present time, the Hall sensors available on the market respond to the intensity of the magnetic field in the range of sensitivity from ca 10 mT to ca 500 mT.

The object of the present invention is to provide a speed sensor for measuring the speed of a gearwheel inside a gearbox, especially that of motor vehicles, which is not susceptible to external disturbing magnetic field of an available permanent magnet placed on an external surface of the gearbox in close proximity of the speed sensor and which provides exact and undistorted information about the speed of the gearwheel or a magnetic sign sensed by such a speed sensor.

SUMMARY OF THE INVENTION

The above discussed drawbacks and deficiencies are avoided and the object of the invention is achieved by a speed sensor for measuring the speed of a gearwheel or a wheel provided with ferromagnetic signs, mounted inside a gearbox, the speed sensor having a housing with its one end adapted for inserting into and fixing to a through-hole of the gearbox so that the front face of the housing faces the gearwheel, whereby in the housing a first Hall sensor with a first Hall detector facing the front face of the housing is arranged and the first Hall detector is connected to an electronic circuit for conversion of an output analog signal to a digital signal, whereby upper and lower threshold values of the output voltages from the first Hall detector, upon excess of which a first analog signal is converted to a first digital signal, are self-adjusting with respect to upper and lower peeks of the analog signal, and whereby the south pole of a first basic magnet engages in alignment with the sensitive axis of the Hall detector the side of the first Hall detector situated opposite the front face of the housing comprising as essential features that in the housing (10) of the speed sensor a second Hall sensor (4) comprising a second Hall detector facing the front face of the housing is arranged and the second Hall sensor is connected to an electronic circuit for conversion of its output second analog signal to a second digital signal, whereby the upper and lower threshold values of the output voltages from the Hall detector, upon excess of which the second analog signal is converted to the second digital signal, are self-adjusting with respect to upper and lower peeks of the analog signal, whereby the north pole of a second basic magnet engages in alignment with the sensitive axis of the Hall sensor the side of the first Hall detector situated opposite the front face of the housing so that the sensitive axes of both the Hall detectors are parallel to each other and the distance between the axes of both the Hall detectors is equal to or less than the width of a tooth of the sensed gearwheel or the width of a ferromagnetic sign of a sensed disc so that the two Hall detectors and basic magnets are arranged such that a disturbing magnet attached to the outer side of the gearbox weakens the magnetic flux in one of the Hall detector while it strengthens the magnetic flux in the second Hall detector and such that at least one of the Hall sensors will remain operative in the presence of the disturbing magnetic field.

Said arrangement of the speed sensor avoids concurrent elimination or reduction of magnetic field of both the opposite oriented basic magnets of the first and the second Hall detector by a disturbing external magnetic field so that, at worst, the intensity of the magnetic field of only one basic magnet from both the Hall detectors is outside the range of sensitivity of the Hall detector. The other magnetic detector, which is exposed to the magnetic field of its basic magnet and strengthened by the magnetic field of the disturbing magnet, produces, when the gearwheel is rotating, an analog signal with higher voltage values then those corresponding to the magnetic field of the basic magnet only. The said strengthened magnetic field does not exceed the sensitivity range of the Hall sensor since, at the present time, no magnets are available, which would have the corresponding dimensions and could be attached to the external surface of the gearbox and would be able to generate a magnetic intensity above the sensitivity limits of the Hall detector at the place inside the gearbox, where the Hall detector is located.

It is advantageous, if the first and second digital signals from the first and second Hall sensors are unified in a RS gate circuit into a single output digital signal the ascending gate of which copies the ascending gate of the prior first or second digital signal and the descending gate of which copies the descending gate of the prior first or second digital signal. This arrangement enables the speed sensor to produce a single output signal providing information about the speed of the gearwheel.

Preferably, the speed sensor may be provided with a processor for comparing the first and the second digital signal and for producing an alarm signal when a deviation between said digital signals is detected.

The alarm signal indicates an attempt to affect the speed sensor.

BRIEF DESCRIPTION OF DRAWINGS

One embodiment of the invention is illustrated on the accompanying drawings where the individual figures show:

FIG. 1a—is a schematic view of magnetic lines of force of a basic magnet when a tooth is present in front of a Hall detector;

FIG. 1b—is a schematic view of magnetic field lines of the basic magnet when a gap is present in front of the Hall detector;

FIG. 2a—is a schematic view of plotted magnetic field lines of the basic magnet and a disturbing magnet, when the tooth is present in front of the Hall detector, whereby the disturbing magnet is magnetically oriented opposite to the basic magnet;

FIG. 2b—is a schematic view of plotted magnetic field lines of the basic magnet and the disturbing magnet when the gap is present in front of the Hall detector, whereby the disturbing magnet is magnetically oriented opposite to the basic magnet;

FIG. 3a—is a schematic view of plotted magnetic field lines of the relevant basic magnet and the disturbing magnet, when the tooth is present in front of the Hall detector, whereby the disturbing magnet is magnetically oriented consistently with the basic magnet;

FIG. 3b—is a schematic view of plotted magnetic lines of force of the basic magnet and the disturbing magnet when the gap is present in front of the Hall detector, whereby the disturbing magnet is magnetically oriented consistently with the basic magnet;

DESCRIPTION OF PREFERRED EMBODIMENTS

Figure 4:
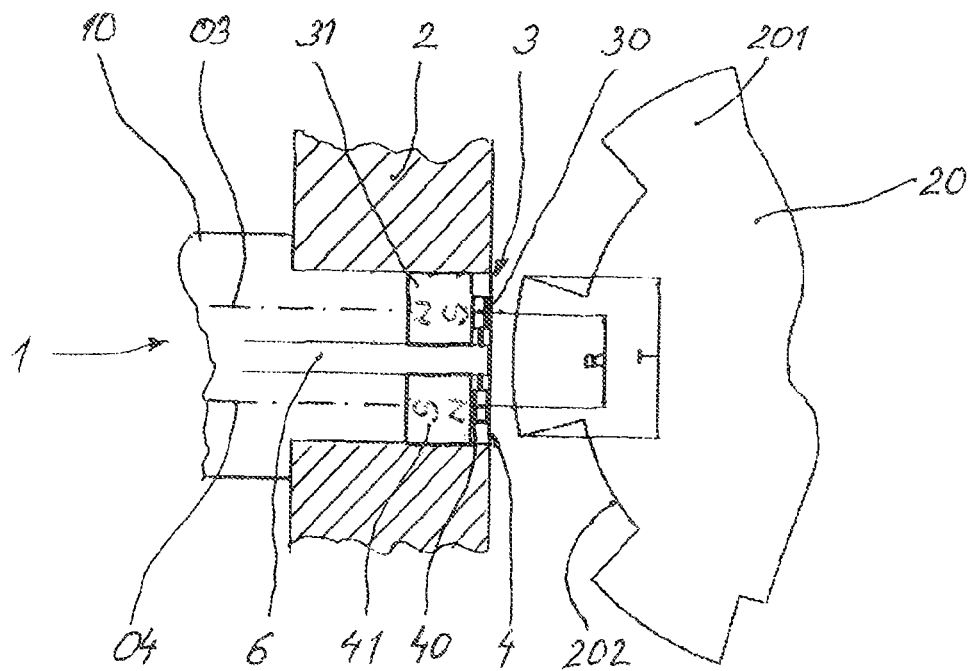
FIG. 4—is a schematic view of a magnetic speed sensor with a gearwheel.

FIG. 1a to 3b show magnetic fields or plots of magnetic lines of force respectively of a relevant, basic magnet 31 of a Hall sensor 3 both at the moment, when a tooth 201 of a gearwheel 20 is located in front of a Hall detector 30 and at the moment, when a gap 202 between the teeth 201 is present in front of the Hall detector 30. The schematically illustrated Hall sensors 3 comprise a Hall detector 30 and a basic magnet 31, oriented by its south pole S towards the Hall detector 30. As shown in FIG. 1a, when the tooth 201 is located in front of the Hall detector 30, the magnetic lines of force of the basic magnet 31 pass through the center of the Hall detector 30 in great density while when the gap 202 is present in front of the Hall detector 30—see FIG. 1b—the magnetic lines of force do not pass through the center of the Hall detector 30.

Like FIG. 1a and FIG. 1b, FIGS. 2a and 2b show plots of magnetic lines of force of the basic magnet 31, which lines are however affected by the magnetic field or lines of force of a disturbing external magnet 5 with its north pole N oriented towards the gearwheel 20, i.e. in the sense, which is opposite to the orientation of the basic magnet 31 of the Hall sensor 3. As shown in FIG. 2a, when the tooth 201 is present in front of the Hall detector 30, the disturbing magnetic field of the identically oriented disturbing magnet 5 causes a higher density of the magnetic lines of force at the center of the Hall detector 30 and accordingly strengthening of the magnetic field. When the gap 202 is present in front of the Hall detector 30 the magnetic lines of force do not pass through the center of the Hall detector 30.

Like FIGS. 2a and 2b, FIG. 3a and FIG. 3b show plots of magnetic lines of force of the basic magnet 31 and the disturbing magnetic field of the disturbing external magnet 5, which is however oriented by its south pole S towards the gearwheel 20, i.e. in the same direction, in which the basic magnet 31 is oriented. As appears from FIGS. 3a and 3b, the mutually repulsive magnetic fields cause that neither in the event, when the tooth 201 is present in front of the Hall detector 30 (FIG. 3a) and nor in the event, when the gap 202 is present in front of the Hall detector 30 (FIG. 3b), no magnetic lines of force pass through the center of the Hall detector 30, i.e. no magnetic field is present in this area or the magnetic field is so week that its value is out of the sensitivity range of the Hall sensor 3.

As appears from the foregoing, the external disturbing magnet 5 may get the Hall detector 30 out of function only when the basic magnet 31 of the Hall detector 30 and the disturbing magnet 5 are identically oriented. If, on the contrary, the magnets are oriented in opposite direction, the magnetic field in the center of the Hall detector 30 is strengthened, what results in strengthening its function and in increase of the output voltage respectively. In the configuration, where the magnetic speed sensor comprises two Hall sensors 3, 4 with the respective basic magnets 31 and 41, which are mutually magnetically oriented in the opposite direction then, when they are affected by the disturbing magnet 5, the function of only such of the Hall sensors 3, 4 is eliminated, whose basic magnet 31, 41 is oriented identically as the disturbing magnet 5. The function of the other Hall sensor 3, 4 will not be affected.

FIG. 4 is a schematic view of the speed sensor 1 according to the invention, which consists of a cylindrical housing 10 the one end of which is provided, for example, with a thread for its fixing to an opening in the gearbox 2, in which the gearwheel 20 is mounted and the speed of which is to be scanned by the speed sensor 1. The gearwheel 20 is provided with teeth 201 mutually separated by gaps 202, whereby the front faces of the teeth 201 are situated approximately at the distance of 0.5 up to 1.5 mm from the front face of the speed sensor 1 in which two Hall sensors 3 and 4 are arranged. The first magnet 31 engages by its south magnetic pole S the first Hall detector 30 and the second magnet 41 engages by its north magnetic pole N the second Hall detector 40.

The first Hall sensor 3 with the first magnet 31 is connected to one side of a printed circuit board 6 and the second Hall sensor 4 with the second magnet 41 is connected to the opposite side of the printed circuit board 6. Each of Hall sensors 3, 4 comprises a Hall detector 30, 40 and an electronic system, which processes the analog output signal from the Hall detector 30, 40 to the digital signal 300, 400. The upper and the lower threshold values of the analog signals voltage, upon which the analog signals are converted to the digital signals 300, 400 are self-adjusting with respect to the upper and lower peeks of the analog signal. The self-adjusting function is achieved, for example, by conversion of the analog signal by means of an A/D converter to the digital signal with fixedly adjusted hysteresis from the maximum and minimum amplitude of the analog signal respectively. This enables the Hall sensors 3, 4 to operate in their range of sensitivity even with great variations of the magnetic flux in the center of the Hall detector 30, 40.

Figure 5:
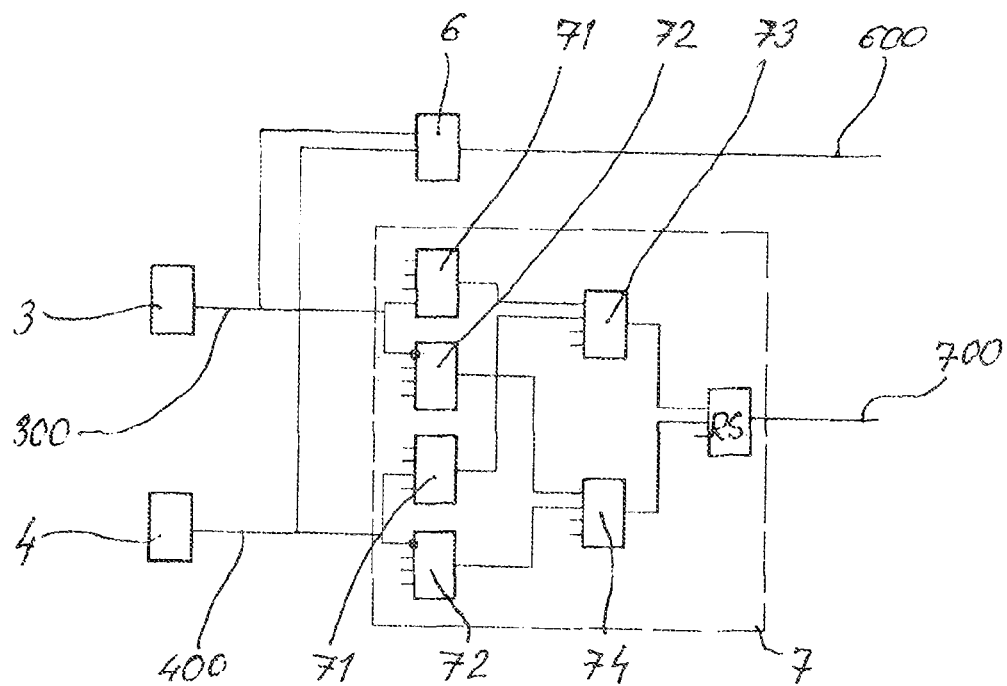
FIG. 5—is a wiring diagram of Hall sensors in the speed sensor.

As appears from FIG. 5, the digital signal 300 exits the Hall sensor 3 and the digital signal 400 exits the Hall sensor 4. Each of those signals is supplied to both a processor 6 and an unifying circuit 7.

In the circuits 71 and 72 of the unifying circuit 7, the ascending and descending gates of the digital signals 300 and 400 are evaluated and after combination thereof in OR circuits 73 and 74, a single output signal 700 of the speed sensor 1 is then formed in the RS circuit, which signal is further transmitted to a tachograph/not shown/. In the tachograph, the output signal 700 is evaluated and transmitted to a recording device. The digital signals 300 and 400 are compared in the processor 6 and if differences have been ascertained, an alarm signal 600 is produced and transmitted to the tachograph to signal that the speed sensor has been adversely affected.

The axis O3 of the first Hall detector 30 is situated in parallel with the axis O4 of the second Hall detector 40 and the distance R between them is the same or lesser than the thickness T of the tooth 201. Consequently, the first and the second Hall detectors 30 and 40 are simultaneously controlled by the same tooth 201 of the gearwheel 20 during its rotation on one hand, and the external disturbing magnetic field of the attached disturbing magnet 5 affects to the same extent the basic magnetic fields of the first and the second basic magnets 31 and 41 on the other hand.

During the rotation of the gearwheel 20, the teeth 201 and gaps 202 pass alternately along the front face of the speed sensor 1 with the Hall detectors 30 and 40 and effect the character of the magnetic lines of force and the intensity of magnetic fields of the basic magnets 31 and 41 in the centers of both the Hall detectors 30 and 40 respectively. Said changes of the intensity then invoke changes in the output voltages from the Hall detectors 30 and 40 and consequently the characters of the output analog signals, which are converted to the digital signals 300, 400 in the Hall sensors 3, 4.

Figure 6:
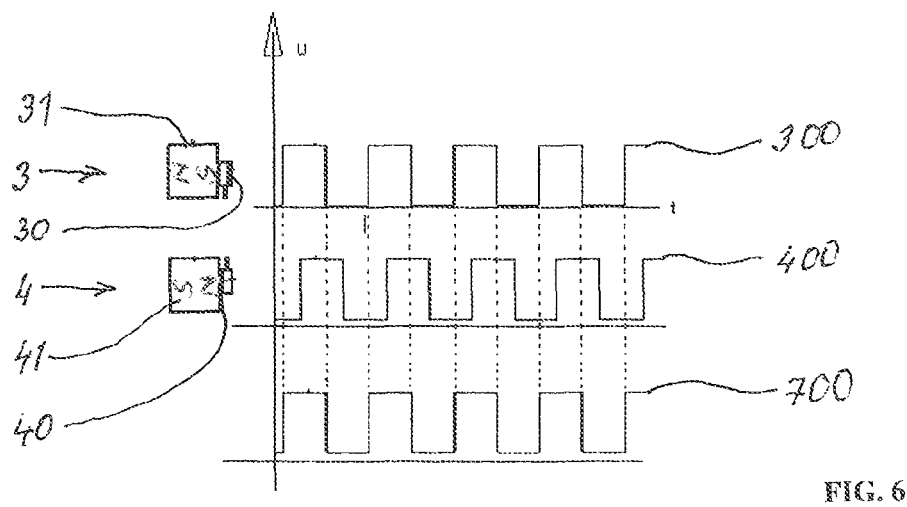
FIG. 6—presents graphs showing digital outputs from the Hall sensors and from the speed sensor not affected by a disturbing magnet.

If the Hall sensors 3, 4 of the speed sensor 1 are not affected by an external disturbing magnetic field then, during rotation of the gearwheel 20, cyclic changes in the intensity of the basic magnetic fields in centers of the Hall detectors 30 and 40 occur, which detectors produce analog signals that are converted to digital signals 300 and 400 in the electronics of the Hall sensors 3 and 4—see FIG. 6. Said digital signals are then combined in the RS circuit to produce the output signal 700 from the speed sensor 1, which provides information about the speed of the gearwheel 20.

If a strong disturbing magnet 5 is attached to the gearbox 2 in close proximity of the speed sensor 1, its disturbing field then affects the basic magnetic fields of the basic magnets 31 and 41 of the first Hall sensor 3 and the second Hall sensor 4 so that one basic magnetic field of one Hall detector is strengthened (FIG. 2a) and the other basic magnetic field of the other Hall detector is depressed, diluted or eliminated as a whole (FIG. 3a).

Figure 7:
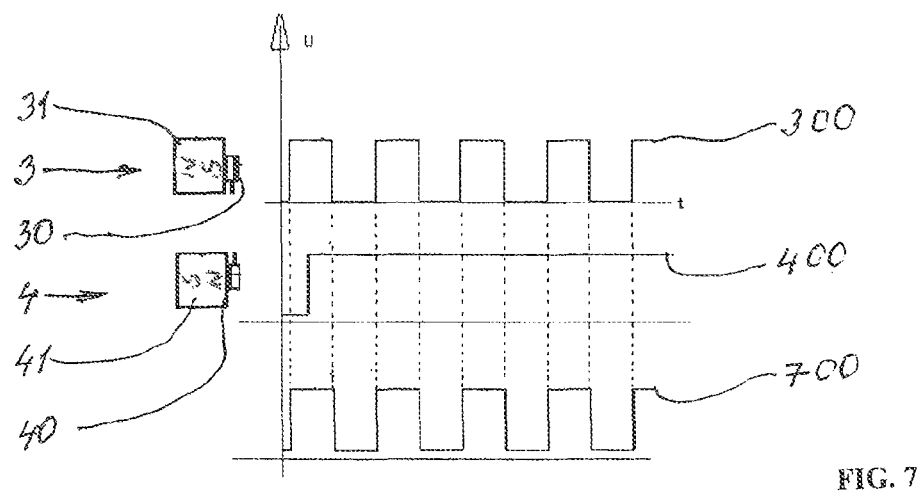
FIG. 7—presents graphs showing digital outputs from the Hall sensors and from the speed sensor affected by the north pole of the disturbing magnet.

If the disturbing magnet 5 is attached to the gearbox 2 by its north pole N as shown in FIG. 2a, FIG. 7, its disturbing magnetic field strengthens the basic magnetic field of the first basic magnet 31 of the first Hall sensor 3 and suppresses the basic magnetic field of the second basic magnet 41 of the second Hall sensor 4. Consequently, the first Hall sensor 3 produces the digital signal 300 and registers accordingly the rotation or full stop of the gearwheel 2. In this situation, the second Hall detector 40, whose own basic magnetic field is suppressed, does not produce a variable analog signal so that no variable digital signal 400 is transmitted from the Hall sensor 4. The resulting digital signal 700 transmitted from the speed sensor 1 has the same frequency and the same duration of the phase as the resulting signal 700 in FIG. 6 and provides an undistorted information about the speed of the gearwheel 20.

Figure 8:
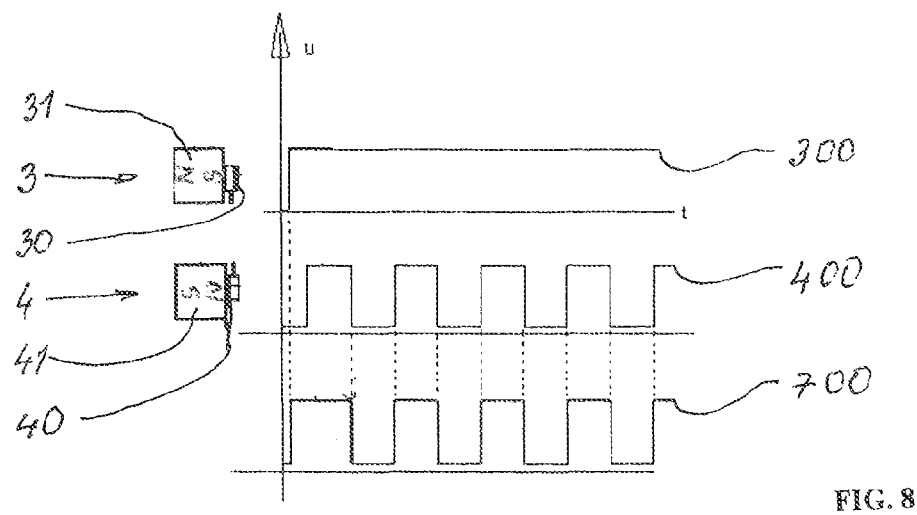
FIG. 8—presents graphs showing digital outputs from the Hall sensors and from the speed sensor affected by the south pole of the disturbing magnet.

If the south pole S of the disturbing magnet is attached to the gearbox 2, as shown in FIG. 3a, FIG. 8, its disturbing magnetic field eliminates the basic magnetic field of the first basic magnet 31 of the first Hall sensor 3 and strengthens the basic magnetic field of the second basic magnet 41 of the second Hall sensor 4. Consequently, the first Hall detector 30 does not produce a variable analog signal and no variable digital signal 300 is transmitted from the first Hall sensor 3. In this situation, the second Hall detector 40, whose basic magnetic field is strengthened, produces a variable analog signal so that the second Hall sensor 4 supplies variable digital signal 400. It is essential that the own basic magnets of both the detectors have opposite magnetic orientation so that any possible disturbing external magnetic field strengthens the magnetic flux from one of the Hall detectors and that the analog signals supplied by both the magnetic detectors are converted to digital signals when the self-adjusting threshold values are exceeded, whereby their value is lesser or higher by optionally elected hysteresis respectively than the upper or lower peek of the analog signal respectively.

The invention claimed is:

1. A speed sensor (1) for measuring the speed of a gearwheel (20) or a wheel provided with ferromagnetic signs, mounted inside a gearbox (2), the speed sensor (1) having a housing (10) with its one end adapted for inserting into and fixing to a through-hole of the gearbox (2) so that the front face of the housing (10) faces the gearwheel (20), whereby in the housing (10) a first Hall sensor (3) with a first Hall detector (30) facing the front face of the housing (10) is arranged and the first Hall detector (30) is connected to an electronic circuit for conversion of an output analog signal to a digital signal, whereby upper and lower threshold values of the output voltages from the first Hall detector (30), upon excess of which a first analog signal is converted to a first digital signal (300), are self-adjusting with respect to upper and lower peeks of the analog signal, and whereby the south pole (S) of a first basic magnet (31) engages in alignment with the sensitive axis (O3) of the Hall detector (30) the side of the first Hall detector (30) situated opposite the front face of the housing (10), characterized in that in the housing (10) of the speed sensor (1) a second Hall sensor (4) comprising a second Hall detector (40) facing the front face of the housing (10) is arranged and the second Hall detector (40) is connected to an electronic circuit for conversion of its output second analog signal to a second digital signal (400), whereby the upper and lower threshold values of the output voltages from the second Hall detector (40), upon excess of which the second analog signal is converted to the second digital signal (400), are self-adjusting with respect to upper and lower peeks of the analog signal, whereby the north pole (N) of a second basic magnet (41) engages in alignment with the sensitive axis (O4) of the second Hall detector (40) the side of the first Hall detector (40) situated opposite the front face of the housing (10) so that the sensitive axes (O3, O4) of both the Hall detectors (30, 40) are parallel to each other and the distance (R) between the axes (O3 and O4) of both the Hall detectors (30 and 40) is equal to or less than the width (T) of a tooth (201) of the sensed gearwheel (20) or the width of a ferromagnetic sign of a sensed disc so that the two Hall detectors (30, 40) and basic magnets (31, 41) are arranged such that a disturbing magnet (5) attached to the outer side of the gearbox (2) weakens the magnetic flux in one of the Hall detector (30) while it strengthens the magnetic flux in the second Hall detector (40) and such that at least one of the Hall sensors (3, 4) will remain operative in the presence of the disturbing magnetic field;

wherein first and second digital signals (300 and 400) from the first and second Hall sensor (3 and 4) are unified in a RS gate circuit into one output digital signal (700) the ascending gate of which copies the ascending gate of the prior first or second digital signal (300 and 400) and the descending gate of which copies the descending gate of the prior first or second digital signal (300 and 400).

2. The speed sensor (1) of claim 1 wherein the speed sensor (1) is provided with a processor (6) for comparing the first and the second digital signal (300 and 400) and for producing an alarm signal (600), when a deviation between said digital signals is detected.

* * * * *